United States Patent

Röhringer et al.

[11] Patent Number: 6,009,903
[45] Date of Patent: Jan. 4, 2000

[54] STEERING REACTION FORCE CONTROL ARRANGEMENT FOR A POWER STEERING SERVO VALVE

[75] Inventors: Arno Röhringer, Ditzingen; Manfred Rombold, Winnenden, both of Germany

[73] Assignee: DaimlerChrysler AG, Stuttgart, Germany

[21] Appl. No.: 08/844,830

[22] Filed: Apr. 22, 1997

[30] Foreign Application Priority Data

Apr. 25, 1996 [DE] Germany .......................... 196 16 439

[51] Int. Cl.⁷ ...................................................... F15B 9/10
[52] U.S. Cl. .................................. 137/625.23; 91/375 A
[58] Field of Search ....................... 91/375 A; 137/625.23

[56] References Cited

FOREIGN PATENT DOCUMENTS

| | | |
|---|---|---|
| 0 468 659 | 1/1992 | European Pat. Off. . |
| 42 42 441 | 5/1994 | Germany . |
| 2 044 697 | 10/1980 | United Kingdom . |
| 2 199 000 | 6/1988 | United Kingdom . |
| 2 250 002 | 5/1992 | United Kingdom . |

*Primary Examiner*—Gerald A. Michalsky
*Attorney, Agent, or Firm*—Klaus J. Bach

[57] ABSTRACT

In a steering reaction force control arrangement for a hydraulic servo valve of a power steering system including a rotary spool rotatable received in a control sleeve and having a portion with axially extending V-shaped grooves disposed within a sleeve structure connected, by a conical engagement structure, to the control sleeve, the sleeve structure has radial bores receiving force transmitting balls which are pressed into the V-shaped grooves by a controllable hydraulic pressure so that the rotary spool can be moved relative to the control sleeve only upon the transmission of a torque sufficient to lift the force transmitting balls against the force of the hydraulic fluid by which they are pressed into the grooves.

4 Claims, 3 Drawing Sheets

STEERING REACTION FORCE CONTROL ARRANGEMENT FOR A POWER STEERING SERVO VALVE

BACKGROUND OF THE INVENTION

The invention relates to a steering reaction control arrangement for a servo valve having a control sleeve receiving a rotary spool for controlling the pressurized hydraulic fluid supply to a power steering mechanism depending on the relative rotation between the rotary spool and the control sleeve.

Hydraulic power steering systems are generally known and are serially installed in most motor vehicles. A example for a power steering system is shown in DE 42 42 441 C1. It is also basically known to change the force which can be felt on the steering wheel or which is to be applied in steering maneuvers depending on certain parameters in order, for example, to make the steering slightly heavier at high speeds and particularly light at very low speeds typical for maneuvering. For this purpose, so-called reaction arrangements are used, by means of which the force necessary for adjusting the servo valve arrangement can be changed. If the servo valve arrangement is a rotary spool type valve, this means that the force necessary for the rotation of the rotary spool and the control sleeve relative to one another can be changed in a controlled manner.

It is the object of the invention to provide a particularly advantageous refinement of the reaction control structure on a servo valve arrangement of the type mentioned above.

SUMMARY OF THE INVENTION

In a steering reaction force control arrangement for a hydraulic servo valve of a power steering system including a rotary spool rotatable received in a control sleeve and having a portion with axial V-shaped grooves disposed within a sleeve structure connected, by a conical engagement structure, to the control sleeve, the sleeve structure has radial bores receiving force transmitting balls which are pressed into the V-shaped grooves by a controllable hydraulic pressure so that the rotary spool can be moved relative to the control sleeve only upon the transmission of a torque sufficient to lift the force transmitting balls against the force of the hydraulic fluid by which they are pressed into the grooves.

With the arrangement according to the invention, the hydraulic center position of the rotary spool arrangement and the center position of the reaction arrangement, essentially comprising the shaft part with the axial v-grooves and the sleeve part as well as the reaction elements, can be adjusted independently of one another before the control sleeve and the sleeve structure are interconnected. Before the control sleeve and the sleeve structure are pressed together, the inner cone on one part and the outer cone on the other part are rotatable relative to one another. By axial compression, a high frictional engagement with good durability is achieved since there is a relatively small conicity, so that the compression connection between the control sleeve and the sleeve structure have a high durability.

According to a particularly preferred embodiment, for which protection is claimed irrespective of the type of connection between the control sleeve and the sleeve structure, provision is made to surround the sleeve structure with an open or closed spring ring which attempts to press the reaction elements that is the balls into the V-grooves.

With this arrangement a minimum force is provided by means of a mechanical component, which force has to be over-come if relative rotation between the spool part and the control sleeve is to be generated. As long as the steering forces actually acting on the steered wheels of the vehicle remain sufficiently low, the above mentioned minimum force is not exceeded during steering maneuvers with the result that the vehicle is steered within a force range below the minimum force, that is without power assistance and the driver is given a very direct feel for the road conditions.

Since, in the assembled state of the reaction arrangement, the sleeve structure is connected to the control sleeve and the spool part to the rotary spool for rotation with one another, the spring force acting on the reaction elements also brings about a restoring force which attempts to return the rotary spool and the control sleeve to a central position relative to one another. If appropriate, a connection between the rotary spool and the control sleeve which is generally provided by means of a torsion rod can be eliminated.

Preferred embodiments of the invention are described below on the basis of the accompanying drawings.

DESCRIPTION OF THE VARIOUS EMBODIMENTS OF THE INVENTION

Figure 1:
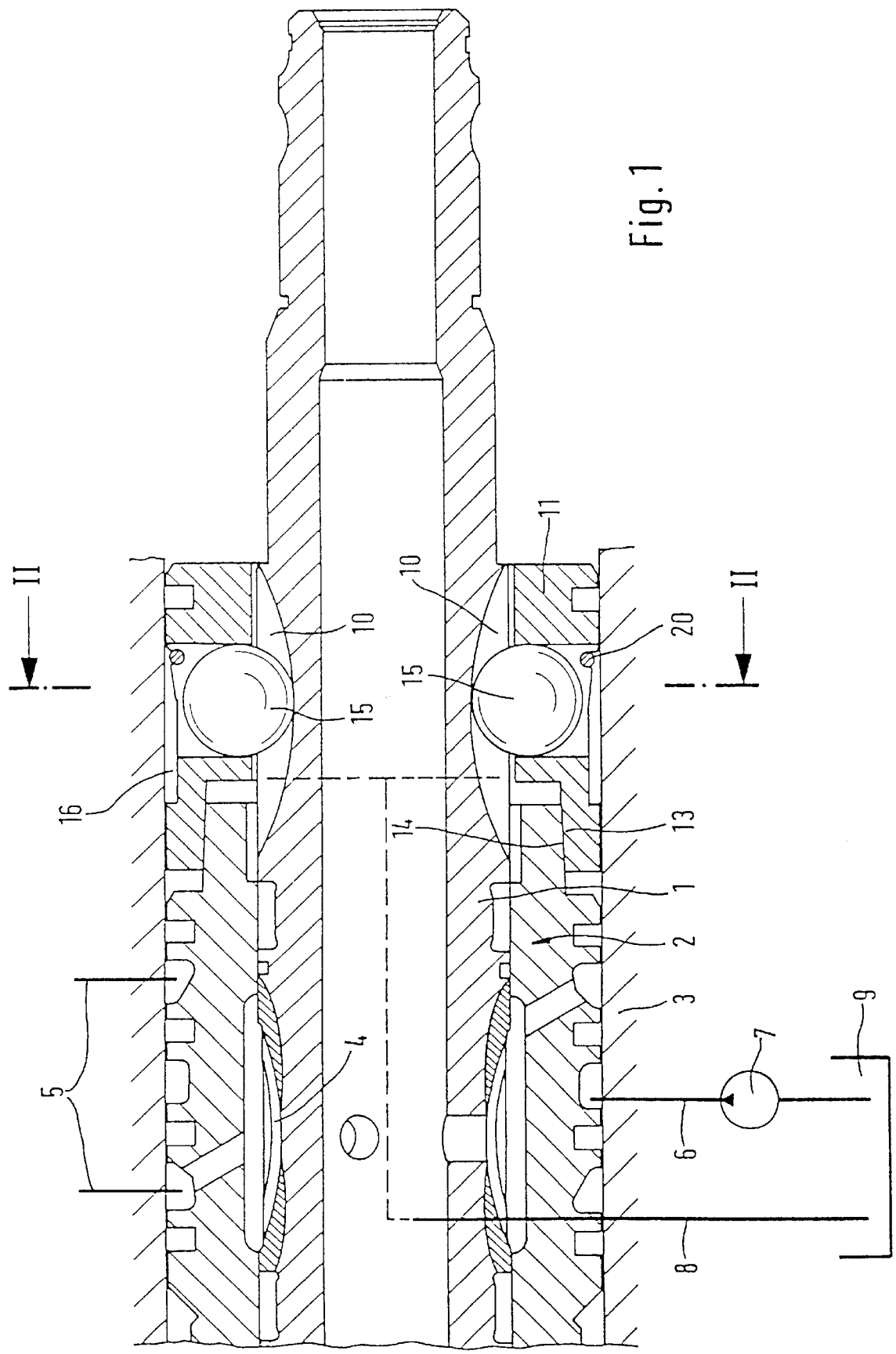
FIG. 1 is a diagrammatic axial cross-sectional view of the rotary spool and control sleeve arrangement according to the invention showing the reaction force generating arrangement.
Figure 2:
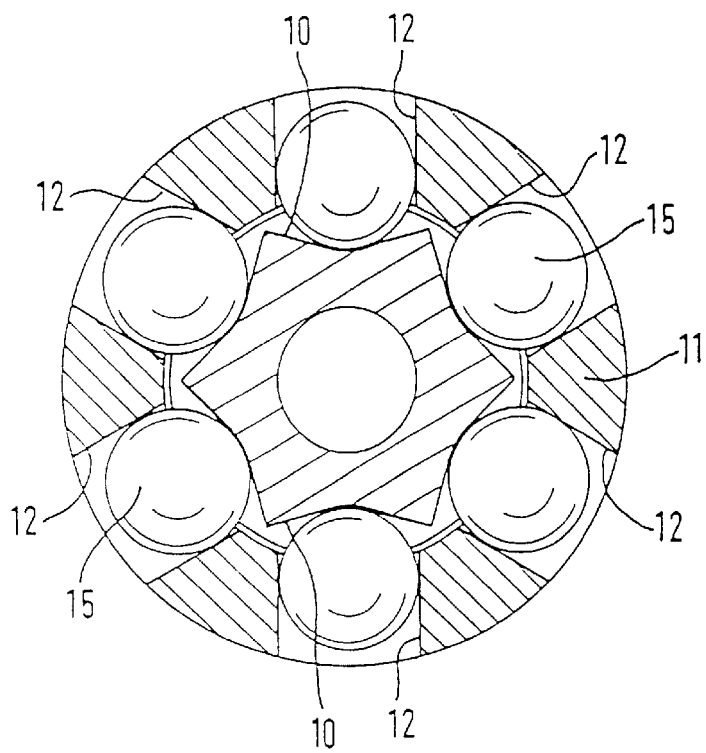
FIG. 2 is a sectional view taken along line II—II of FIG. 1.

As shown in FIG. 1, a rotary spool 1 is surrounded by a control sleeve 2 which is disposed co-axially therewith and is rotatably supported inside a housing 3.

The rotary spool I and the control sleeve 2 can be rotated relative to one another to a limited extent. They have axially extending control edges 4 which interact with one another as their then positions are adjusted relative to one another. This results in the generation of a controllable pressure difference between two operating ports 5 (illustrated only diagrammatically) in one or the opposite sense, depending on the relative direction of rotation of the rotary spool 1 and the control sleeve 2. The two hydraulic operating ports for the steering mechanism are hydraulically connected between a pressure port 6 (illustrated only diagrammatically) connected to the pressure side of a hydraulic pump and a port 8 (likewise illustrated only diagrammatically) connected to a hydraulic fluid reservoir 9. The suction side of the pump 7 is in communication with the reservoir 9. This arrangement however, is known in principle and therefore does not need to be described in detail.

The rotary spool 2 has a shaft section which, in axially spaced relationship from its control edges 4, has axial V-grooves 10 distributed uniformly over its circumference. The V-grooves reach a maximum depth in their axial center section, which depth decreases continuously towards their axial ends in such a way that the center line of each V-groove 10 follows a circular arc as can be seen in FIG. 1.

The shaft section of the rotary spool 1 provided with the V-grooves 10 is surrounded by a sleeve structure 11 which has a number of radial bores 12 corresponding to the number of V-grooves 10. The sleeve structure 11 is securely connected to the control sleeve 2 for rotation therewith in such a way that the center axes of the radial bores 12 are each contained in an axial plane of the rotary slide 1 containing the longitudinal center line of a V-groove 10 when the rotary spool 1 and the control sleeve 2 are in their center position relative to one another, wherein the hydraulic pressure is the same at both ports 5.

The sleeve structure 11 and the control sleeve 2 are firmly connected to one another in an appropriate relative position, in that the sleeve structure 11 with an inner cone 13 is pressed onto an outer cone 14 on the control sleeve 2. This connection permits precise adjustment of the sleeve structure 11 relative to the control sleeve 2.

Received displaceably in the radial bores 12 are balls 15 which can be hydraulically pressed into the V-grooves 10 with greater or lesser force.

For this purpose, hydraulic fluid under pressure can be admitted to an annular space 16 formed in the housing 3 in the region of the radial bores 12 as indicated by the hydraulic port 16' the hydraulic pressure of which can be controlled as a function of certain parameters. Moreover, the V-grooves 10 is in communication with the low pressure hydraulic reservoir 9 in a manner illustrated only diagrammatically, so that the balls 15 can effectively be biased into the V-grooves 10.

When the rotary spool 1 and the control sleeve 2 of the servo valve arrangement are rotated relative to one another, the sleeve structure 11 also rotates relative to the shaft section with the V-grooves 10, with the result that the balls 15 rest only against either of the opposite flanks of the V-grooves 10. Depending on the compression forces which attempt to force the balls 15 radially inwards, a restoring force is generated which counteracts any angular displacement of the rotary spool 1 and the control sleeve 2 from their central position relative to one another.

If appropriate, an essentially annular spring 17 (FIGS. 3–5) may be arranged in the region of the radial bores 12 on the outer circumference of he sleeve structure 11, which spring provides a basic force biasing the balls 15 radially inwardly irrespective of the hydraulic pressure applied to the balls 15. In this way, a basic load can be provided which has to be overcome if the sleeve structure 11 is to be rotated relative to the spool or shaft part with the V-grooves 10 for activation of the power assist.

Figure 3:
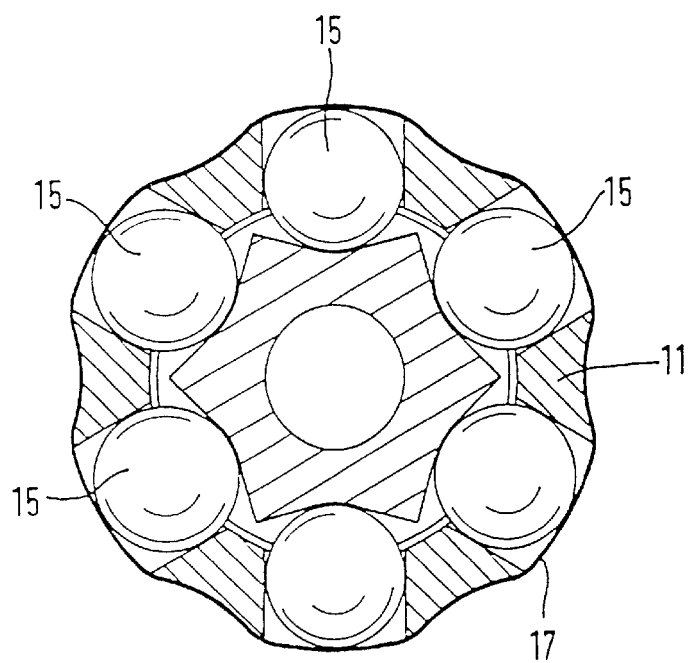
FIG. 3 is a sectional view taken along line II—II of FIG. 1 showing a slightly a modified embodiment.

As shown in FIG. 3, the spring 17 may be a closed resilient ring.

Figure 4:
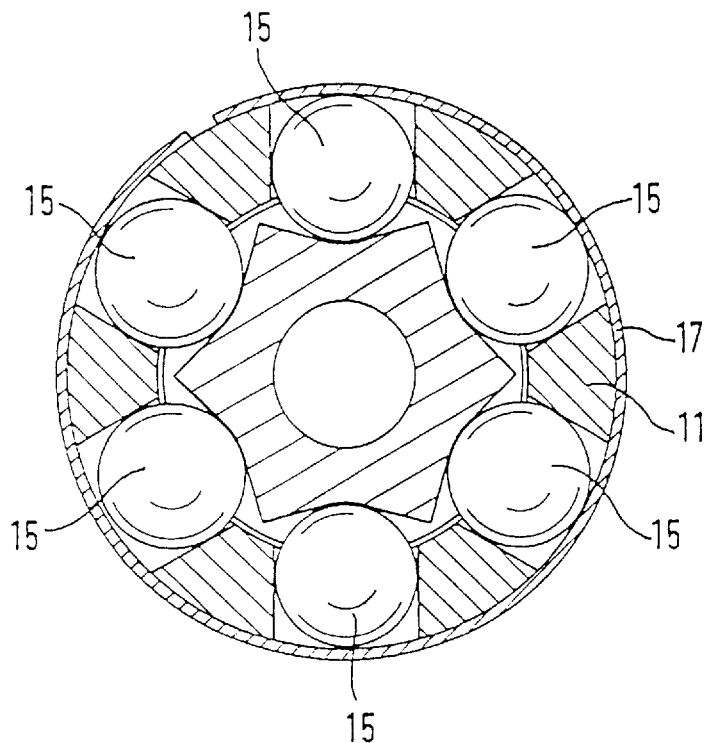
FIG. 4 shows an illustration, corresponding to that of FIG. 2, of a further embodiment.

As shown in FIG. 4, the spring 17 may be an open spring ring.

Figure 5:
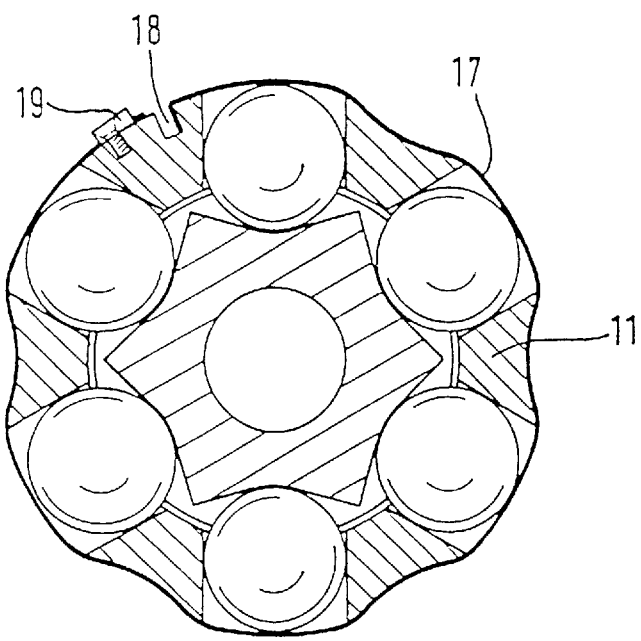
FIG. 5 shows, in an illustration corresponding to that of FIG. 2, a still further modified embodiment of the invention.

And as shown in FIG. 5, the spring 17 may be engaged at one end in a recess 18 formed in the sleeve structure 11 and attached at the other end to the sleeve structure by means of an adjusting screw 19 with an eccentric means permitting adjustment of the spring tension.

Instead of a spring, a simple spring clip 20 as shown in FIG. 1 may be provided, which essentially serves only to secure the balls 15 in the radial bores 12 during assembly.

Furthermore, however, the spring clip 20 also brings about an additional force which presses the balls 15 radially inwards as soon as the sleeve structure 11 has been rotated relative to the V-grooves 10 to the extent that the balls 15 are moved outwardly beyond the clearance and engage the spring ring 20 as they are then forced against the spring ring 20 by the interaction with the flanks of the V-grooves 10.

What is claimed is:

1. A steering reaction force control arrangement for a hydraulic servo valve of a power steering system, comprising a rotary spool disposed within a control sleeve so as to be rotatable therein relative to the control sleeve, said rotary spool having a portion with axially extending V-shaped grooves formed therein in circumferentially spaced relationship, a sleeve structure surrounding the grooved portion of said rotary spool and having guide passages extending radially through said sleeve structure, said control sleeve and said sleeve structure having cooperating conically shaped adjacent end portions, one being provided with an outer cone structure and the other with an inner cone structure by which they are engaged with one another in an angular position in which said radial guide passages are in radial alignment with said grooves, and force transmitting elements are disposed in said radial guide passages and pressed into said grooves under the force of hydraulic fluid admitted to said radial guide passages such that relative motion between said rotary spool and said guide sleeve occurs only upon transmission of a torque sufficient to lift said force transmitting elements against the force of said hydraulic fluid in said radial guide passages.

2. An arrangement according to claim 1, wherein a spring extends around said sleeve structure in the area of said radial guide passages and engages said force transmitting elements disposed in said radial guide passages so as to bias them into engagement with said V-shaped grooves with a predetermined base force.

3. An arrangement according to claim 1, wherein said radial guide passages are radial bores and said force transmitting elements are balls slideably received in said radial bores.

4. An arrangement according to claim 1, wherein hydraulic fluid passages extends from said V-shaped grooves to a low pressure fluid port for draining hydraulic fluid from the V-shaped grooves at one side of said force transmitting elements while their other side is subjected to the force of the hydraulic fluid admitted to said radial guide passages.

* * * * *